US012023931B2

(12) United States Patent
Hashimoto et al.

(10) Patent No.: US 12,023,931 B2
(45) Date of Patent: Jul. 2, 2024

(54) LIQUID EJECTION HEAD AND MANUFACTURING METHOD THEREOF

(71) Applicant: CANON KABUSHIKI KAISHA, Tokyo (JP)

(72) Inventors: Yusuke Hashimoto, Kanagawa (JP); Junichiro Iri, Kanagawa (JP); Makoto Watanabe, Kanagawa (JP); Masatomo Ojima, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/385,067

(22) Filed: Jul. 26, 2021

(65) Prior Publication Data

US 2022/0032625 A1 Feb. 3, 2022

(30) Foreign Application Priority Data

Jul. 31, 2020 (JP) ................................ 2020-130914

(51) Int. Cl.
*B41J 2/16* (2006.01)
*B41J 2/14* (2006.01)

(52) U.S. Cl.
CPC ......... *B41J 2/1629* (2013.01); *B41J 2/14016* (2013.01); *B41J 2/14201* (2013.01); *B41J 2/1601* (2013.01); *B41J 2/1607* (2013.01)

(58) Field of Classification Search
CPC .. B41J 2/1629; B41J 2/14016; B41J 2/14201; B41J 2/1601; B41J 2/1607; B41J 2/1623; B41J 2/1631; B41J 2/1632; B41J 2/1635; B41J 2/1645; B41J 2/1603
See application file for complete search history.

(56) References Cited

U.S. PATENT DOCUMENTS 4,851,371 A * 7/1989 Fisher ............... H01L 21/30608
347/42
7,591,071 B2 9/2009 Ibe et al.
9,333,749 B2 5/2016 Kato et al.
(Continued)

FOREIGN PATENT DOCUMENTS

JP 08-281954 A 10/1996
JP 2006-210815 A 8/2006
JP 2006-281679 A 10/2006
(Continued)

OTHER PUBLICATIONS

IP.com search (Year: 2023).*
Office Action dated Mar. 26, 2024, in Japanese Patent Application No. 2020-130914.

*Primary Examiner* — Lisa Solomon
(74) *Attorney, Agent, or Firm* — Venable LLP

(57) ABSTRACT

A manufacturing method of a liquid ejection head includes steps of providing an ejection orifice forming member on one surface of a wafer, with an energy-generating element being provided on the one surface of the wafer; forming a recess on the other surface of the wafer; and dicing the wafer along a plurality of dicing lines. The plurality of dicing lines include a dicing line extending in one direction and a dicing line extending in a direction crossing the one direction, and the recess is formed on each of positions overlapping the dicing lines except for an intersection part where the dicing line extending in the one direction intersects the dicing line extending in the direction crossing the one direction.

12 Claims, 7 Drawing Sheets

(56) References Cited

U.S. PATENT DOCUMENTS

2013/0139388 A1* 6/2013 Kato ...................... B41J 2/1603
29/890.1

FOREIGN PATENT DOCUMENTS

JP 2007-301886 A 11/2007
JP 2010-278309 A 12/2010
JP 2013-212681 A 10/2013

* cited by examiner

LIQUID EJECTION HEAD AND MANUFACTURING METHOD THEREOF

BACKGROUND OF THE INVENTION

Field of the Invention

The present disclosure relates to a liquid ejection head and a manufacturing method thereof.

Description of the Related Art

Element substrates of liquid ejection heads such as an inkjet recording head are manufactured by the same manufacturing method as semiconductor substrates. That is, on a wafer whose planar shape is a circle having a diameter of 3 inches to 8 inches (76.2 mm to 203 mm), about several tens to several hundreds of patterns of ejection orifices, energy-generating elements, or the like are formed by a thin film process using a photolithography technology. The wafer is then diced on a pattern basis to obtain a plurality of element substrates. Japanese Patent Application Laid-Open No. H08-281954 proposes a method of dicing a wafer by sand erosion. Since dry films are attached to both sides of a wafer before sand erosion is performed, however, if dicing is performed after ejection orifices or the like are formed on the wafer, there is a concern of a reduction in water repellency on the ejection orifice forming surface or the like.

Japanese Patent Application Laid-Open No. 2006-281679 proposes a dicing method of forming recesses corresponding to dicing lines in the back surface of a wafer, then attaching dicing tapes thereto, and cutting the wafer from the front surface side to the back surface side by using a dicing blade. The cut amount by the dicing blade is controlled so that the blade edge projects inside the recess in the back surface of the wafer but does not come into contact with the dicing tape.

SUMMARY OF THE INVENTION

In the dicing method disclosed in Japanese Patent Application Laid-Open No. 2006-281679, it is not easy to form recesses corresponding to dicing lines at high accuracy in the back surface of a wafer by wet etching. In particular, since the intersection portions of vertical and lateral dicing lines have a complex etching surface, it is extremely difficult to form the recesses at high accuracy by controlling the dimension of the recesses. Low dimension accuracy of recesses on the back surface of a wafer results in an unstable external shape of element substrates forming an ejection portion of a liquid ejection head, which reduces the performance of the liquid ejection head and reduces the manufacturing yield of liquid ejection heads.

The object of the present disclosure is to provide a liquid ejection head that achieves an accurate external shape of element substrates, high liquid ejection performance, and a high manufacturing yield and provide a manufacturing method thereof.

A manufacturing method of a liquid ejection head of the present disclosure includes steps of: providing an ejection orifice forming member on one surface of a wafer, in which an energy-generating element is provided on the one surface of the wafer; forming a recess on the other surface of the wafer; and dicing the wafer along a plurality of dicing lines. The plurality of dicing lines include a dicing line extending in one direction and a dicing line extending in a direction crossing the one direction, and the recess is formed on each of positions overlapping the dicing lines except for an intersection part where the dicing line extending in the one direction intersects the dicing line extending in the direction crossing the one direction.

Further features of the present invention will become apparent from the following description of exemplary embodiments with reference to the attached drawings.

BRIEF DESCRIPTION OF THE DRAWINGS

FIG. 2A, FIG. 2B, FIG. 2C, FIG. 2D, FIG. 2E, FIG. 2F1, FIG. 2F2, FIG. 2G1, and FIG. 2G2 are sectional views illustrating the manufacturing method of the liquid ejection head illustrated in FIG. 1 in the order of steps.

DESCRIPTION OF THE EMBODIMENTS

Figure 1:
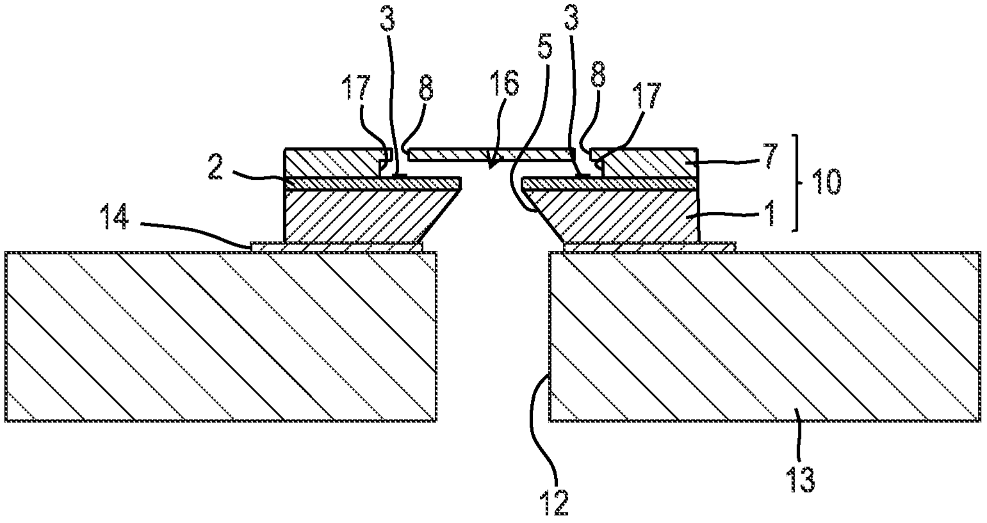
FIG. 1 is a sectional view illustrating a liquid ejection head manufactured by a manufacturing method according to the present disclosure.

Preferred embodiments of the present disclosure will be described below with reference to the drawings. In the following description, components having the same function are labeled with the same references, and duplicated description thereof may be omitted. FIG. 1 is a sectional view illustrating a main part of a liquid ejection head according to the present disclosure. In the basic structure of this liquid ejection head, an element substrate 10 is bound to a support member 13 via an adhesive agent 14. The element substrate 10 has a substrate 1 and an ejection orifice forming member 7. A front layer 2 made of silicon oxide or silicon nitride is formed on one of the surfaces (the upper surface in FIG. 1) of the silicon substrate 1. A liquid supply path 5 that is a through hole is formed in the substrate 1. A predetermined number of energy-generating elements 3 (for example, electro-thermal conversion elements, piezoelectric elements, or the like) that generate energy used for ejecting a liquid such as ink from ejection orifices 8 are disposed in the front layer 2. The resin ejection orifice forming member 7 is provided so as to overlap the front layer 2. The ejection orifice forming member 7 has the ejection orifices 8 and forms a common liquid chamber 16 and pressure chambers 17 between the substrate 1 and the ejection orifice forming member 7. The common liquid chamber 16 communicates with the supply path 5 of the substrate 1 and communicates with the plurality of pressure chambers 17. The plurality of pressure chambers 17 are provided such that the energy-generating element 3 is located inside each of the pressure chambers 17. Furthermore, the ejection orifice 8 opened to outside from each pressure chamber 17 is provided. The supply path 5 of the substrate 1 communicates with an opening 12 of the support member 13.

In this liquid ejection head, a liquid such as ink is supplied to each pressure chamber 17 from a tank or the like (not illustrated) via the opening 12, the supply path 5, and the common liquid chamber 16. Further, at least one of the plurality of energy-generating elements 3 is selectively supplied with power via electrical wirings (not illustrated) and driven. When an electro-thermal conversion element is used as the energy-generating element 3, heat is generated when the energy-generating element 3 is driven, a liquid located near the energy-generating element 3 inside the pressure chamber 17 is heated into foam, and a droplet is ejected from the ejection orifice 8 due to a foaming pressure. In such a case, the front layer 2 made of silicon oxide or silicon nitride may also serve as a heat storage layer. When a piezoelectric element is used as the energy-generating element 3, mechanical oscillation occurs when the energy-generating element 3 is driven, and a liquid located near the energy-generating element 3 is pressurized inside the pressure chamber 17 and ejected as a droplet from the ejection orifice 8. In such a way, suitable energy-generating elements 3 are selectively driven at suitable timings, thereby droplets are ejected and attached onto a recording medium (for example, paper) (not illustrated), and text, a figure, a pattern, or the like is formed on the recording medium.

Figure 2A:
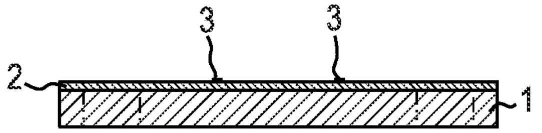

A manufacturing method of a liquid ejection head according to the present disclosure will be described. As illustrated in FIG. 2A, a silicon wafer whose crystal plane orientation is <100> or <110> is prepared. The wafer is a disc having a large area as illustrated in FIG. 3A, which is a member that will be divided into a plurality of substrates 1 (see FIG. 1), and labeled with the same reference 1 as the substrate. The front layer 2 made of silicon oxide or silicon nitride is formed on one of the surfaces of the wafer 1 (the upper surface in FIG. 2A to FIG. 2G2). The front layer 2 made of silicon oxide or silicon nitride functions as a stop layer for anisotropic etching described later. A predetermined number (the same number as that of pressure chambers 17) of energy-generating elements 3 (for example, electro-thermal conversion elements, piezoelectric elements, or the like) are then disposed at predetermined positions on the front layer 2 (positions corresponding to the pressure chambers 17). Respective energy-generating elements 3 are connected to control signal input electrodes (not illustrated) for the operations thereof. Further, although not illustrated, various functional layers such as a protective layer are provided in general for the purpose of improvement in durability of the energy-generating element 3. Note that, as a protective layer, the front layer 2 made of silicon oxide or silicon nitride may also be used.

Figure 2B:
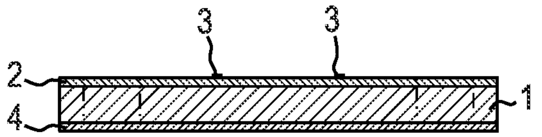
Figure 2C:
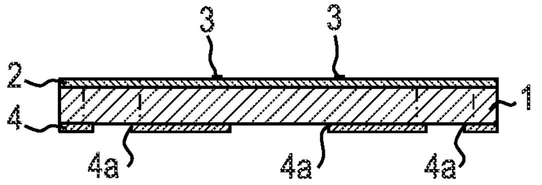

As illustrated in FIG. 2B, a mask material 4 for forming the supply path 5 and recesses 11 is provided on the other surface of the wafer 1 (the under surface in FIG. 2A to FIG. 2G2), in which no energy-generating element 3 is formed. As illustrated in FIG. 2C, the mask material 4 is patterned to form mask material openings 4*a*. The mask material openings 4*a* include a portion that corresponds to the supply path 5 provided in the substrate 1 and portions that correspond to dicing lines 9 used for dividing the wafer 1 later to obtain a plurality of element substrates 10 (see FIG. 2E) and are located between adjacent element substrate forming portions. As illustrated in FIG. 3A and FIG. 3B that is an enlarged view of the portion A illustrated in FIG. 3A, a plurality of dicing lines 9 are provided in the wafer 1. The plurality of dicing lines 9 include dicing lines 9 extending in one direction (for example, the vertical direction in FIG. 3A and FIG. 3B) and dicing lines 9 extending in a direction crossing the one direction (for example, the lateral direction in FIG. 3A and FIG. 3B). No opening is formed to leave the mask material 4 in portions (intersection parts) 53 where these dicing lines intersect each other and a circumference edge part 54 of the wafer 1. The mask material openings 4*a* can be accurately formed by using a double-sided mask aligner or the like, and the recesses 11 corresponding to the supply path 5 and the dicing lines 9 can be arranged at high positional accuracy with respect to the energy-generating elements 3. The mask material 4 serves as a mask for anisotropic etching of silicon, and a silicon oxide film, a silicon nitride film, a polyether amide resin film, or the like may be preferably used. When a silicon oxide film or a silicon nitride film is used as the mask material 4, it is possible to provide the mask material 4 also on one surface of the wafer 1 (the surface on which the energy-generating elements 3 are formed) if necessary. The mask material 4 on one surface of the wafer 1 may also serve as the protective layer or the like described above.

Figure 2D:
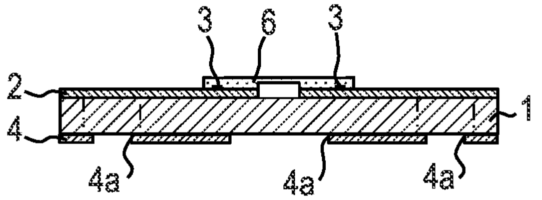
Figure 3A:
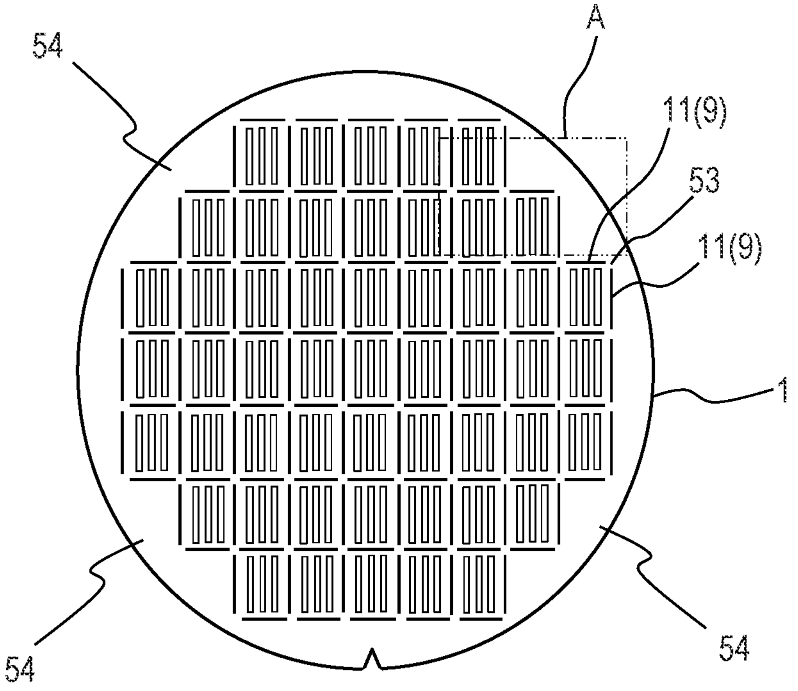
FIG. 3A and FIG. 3B are a plan view and an enlarged plan view illustrating a part of the manufacturing method of the liquid ejection head illustrated in FIG. 2A to FIG. 2G2.
Figure 3B:
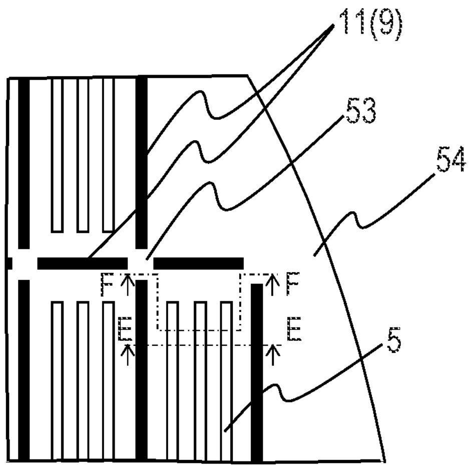

Next, as illustrated in FIG. 2D, a mold material 6 is formed on the wafer 1. First, a soluble resin is applied on the wafer 1 by a spin coating method, a direct coating method, a spray method, or the like or is deposited on the wafer 1 by a roll coating method. The resin formed on the wafer 1 is then patterned so as to be patterns corresponding to the common liquid chamber 16 and the pressure chambers 17 to form the mold material 6. As a patterning method, a resist is applied by a photolithography technology, exposure and development are performed to form resist patterns, etching is performed by using the resist as a mask, and thereby desired patterns can be formed. Further, a photosensitive material may be used to perform direct patterning, or the material may be filmed and then attached to the wafer 1 to form the mold material 6.

Figure 2E:
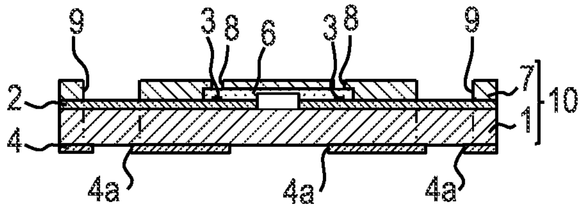
Figure 2E:
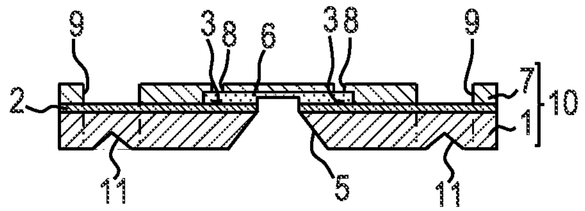
Figure 2E:
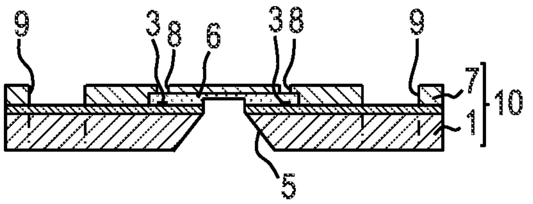
Figure 2E:
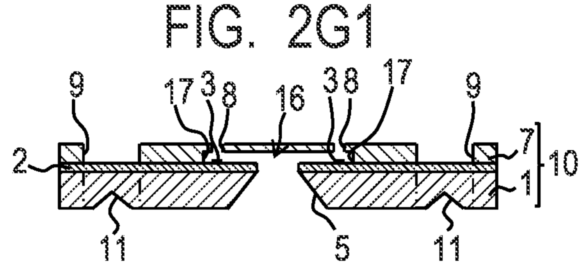
Figure 2E:
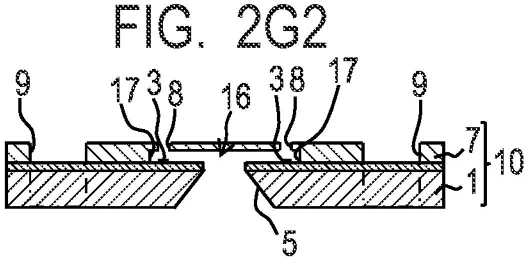

As illustrated in FIG. 2E, the resin ejection orifice forming member 7 is formed so as to overlap the mold material 6. The ejection orifice forming member 7 serves as a structure material of the liquid ejection head and thus is required to have properties such as a high mechanical strength, heat resistance, adhesion to the wafer 1, resistance against a liquid, a property not altering a liquid, or the like. In particular, it is preferable that the ejection orifice forming member 7 be made of a resin material that is polymerized and cured and strongly adhered to the wafer 1 by being subjected to application of light or thermal energy. The ejection orifices 8 and the dicing lines 9 are formed in the ejection orifice forming member 7. The dicing lines 9 are provided at positions corresponding to contours of individual element substrates 10 cut out from the wafer 1, the wafer 1 provided with the ejection orifice forming member 7 is diced along the dicing lines 9, and thereby a plurality of element substrates 10 are formed. That is, the element substrate 10 is formed of the substrate 1, which is obtained after the wafer 1 is divided along the dicing lines 9, and the ejection orifice forming member 7 provided on the substrate 1. Each dicing line 9 is a groove-shaped cut-out part provided in the resin material forming the ejection orifice forming member 7 and may completely penetrate the ejection orifice forming member 7 or may not penetrate the ejection orifice forming member 7. When the dicing line 9 does not penetrate the ejection orifice forming member 7, the element substrate 10 can be obtained by dicing the wafer 1 and the ejection orifice forming member 7 at the same time along the dicing lines 9. As a method of forming the ejection orifices 8 and the dicing lines 9, it is possible to form the ejection orifices 8 and the dicing lines 9 by forming resist patterns by a photolithography technology and then performing etching in the same manner as patterning of the mold material 6. Further, the ejection orifices 8 and the dicing lines 9 may be formed by direct patterning of a photosensitive material or attaching of a filmed material to the wafer 1.

After the ejection orifice forming member 7 in which the ejection orifices 8 and the dicing lines 9 are formed is cured, the wafer 1 is immersed in a silicon anisotropic etching liquid represented by a strong alkaline solution, and thereby the supply path 5 and the recesses 11 are formed at the same time as illustrated in FIG. 2F1. At this time, the surface of the wafer 1 is protected if necessary. The silicon anisotropic etching is to utilize a difference in solubility between crystal orientations against an alkaline etching solution, and the etching is stopped at the <111> plane exhibiting substantially no solubility. Therefore, the shape of the supply path 5 differs depending on the plane orientation of the wafer 1. In a case of the wafer 1 made of silicon with the plane orientation <100>, the supply path 5 having an inclination angle $\theta=54.7°$ relative to the surface is formed. In a case of the wafer 1 made of silicon with the plane orientation <110>, the supply path 5 having an inclination angle $\theta=90°$ relative to the surface is formed.

Figure 4A:
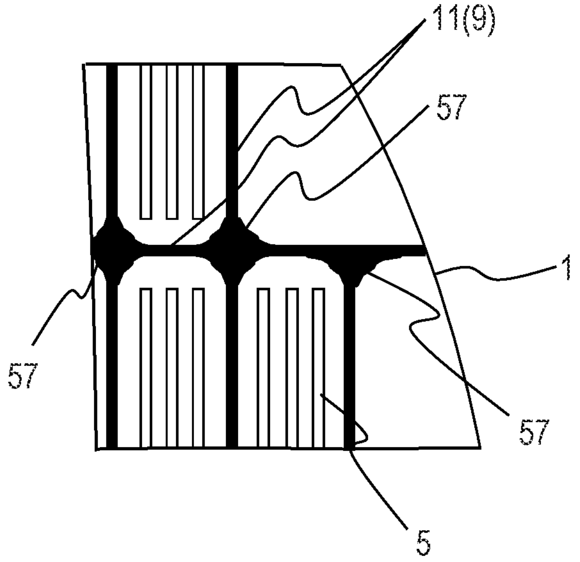
FIG. 4A and FIG. 4B are enlarged plan views illustrating a part of a manufacturing method of a liquid ejection head of a reference example.

However, it is not easy to form the recesses 11 corresponding to the dicing lines 9 at high accuracy by immersing the wafer 1 in a silicon anisotropic etching liquid and performing wet etching. In particular, since the intersection part 53 of the dicing lines 9 has a complex etching surface, it is extremely difficult to form the recesses 11 at the intersection parts 53 at high accuracy, and pattern anomalies 57 may occur as seen in a reference example illustrated in FIG. 4A. If the recesses 11 are formed as illustrated in FIG. 4A, it is difficult to obtain the element substrates 10 having a desired external shape. Accordingly, in the present embodiment, the recess 11 is not formed at the intersection part 53 of the dicing lines 9, and the intersection part 53 remains to be flat as illustrated in FIG. 2F2, FIG. 3A, and FIG. 3B. That is, the recesses 11 are formed at positions overlapping the dicing lines 9 except for the intersection part 53 of the dicing lines. FIG. 2F1 and FIG. 2G1 are sectional views taken along the line E-E illustrated in FIG. 3B, which are partial simplified schematic sectional views. FIG. 2F2 and FIG. 2G2 are sectional views taken along the line F-F illustrated in FIG. 3B, which are partial simplified schematic sectional views. As discussed above, the recesses 11 and the supply path 5 at positions except for the intersection part 53 are formed along the dicing lines 9 of the wafer 1. The mask material 4 is then removed from the other surface of the wafer 1 (the surface opposite to the surface on which the energy-generating elements 3 are formed). When a protective material is provided on the wafer 1, such a protective material is also removed. However, such a protective material may be left without removal in order to use, as a protective film, the pattern of the silicon oxide film or the silicon nitride film used as the mask material 4. Subsequently, as illustrated in FIG. 2G1 and FIG. 2G2, the mold material 6 made of a soluble resin is eluted, and the basic structure of the element substrate 10 having the common liquid chamber 16, the pressure chambers 17, the energy-generating elements 3, the ejection orifices 8, and the like is formed.

Figure 5A:
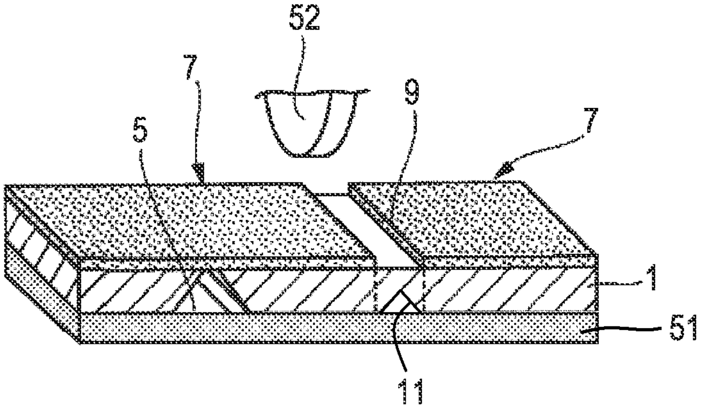
FIG. 5A and FIG. 5B are a perspective view and a sectional view schematically illustrating a step subsequent to the steps of FIG. 2A to FIG. 2G2 in the manufacturing method of the liquid ejection head illustrated in FIG. 1.
Figure 5B:
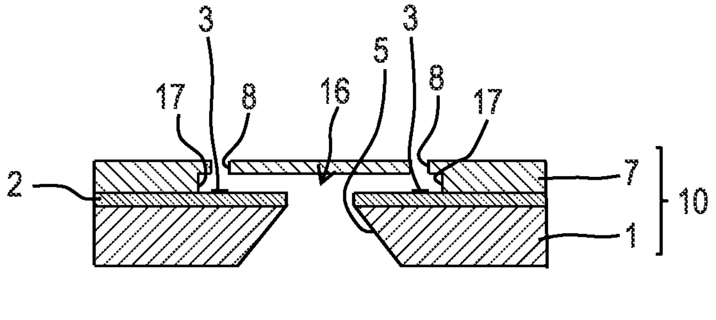

Next, as schematically illustrated in FIG. 5A, the wafer 1 is diced along the plurality of dicing lines 9 and divided into a plurality of element substrates 10. To prevent the plurality of element substrates 10 from being apart from each other after dicing, a dicing tape 51 is attached to the other surface of the wafer 1 (the surface opposite to the surface on which the energy-generating elements 3 are formed). In general, the dicing tape 51 is such that an adhesive layer of an adherent acrylic material is formed on a resin base material, and the wafer 1 is held and fixed thereto by an adhesive layer. Next, while being rotated, a dicing blade 52 is moved along the recess 11 corresponding to the dicing line 9 located between adjacent element substrates 10. Thereby, the wafer 1 fixed to the dicing tape 51 is diced into individual element substrates 10 having a desired size as illustrated in FIG. 5B. The dicing is performed by controlling the cut amount so that the blade edge of the dicing blade 52 projects inside the recess 11 of the wafer 1 but does not come into contact with the dicing tape 51 during dicing.

The diced element substrate 10 is adhered to the support member 13 by the adhesive agent 14, and a main portion (chip unit) of the liquid ejection head as illustrated in FIG. 1 is formed. It is desirable that the adhesive agent 14 be a thermosetting adhesive agent having a low viscosity and a low curing temperature and having an ink-resistant epoxy resin as a primary component. Although not illustrated, a liquid supply member and an electric junction member used for driving the energy-generating elements 3 are connected to the chip unit formed in such a way, sealing for protecting the electric junction part is performed, and thereby the liquid ejection head is completed.

As described above, when the recesses 11 corresponding to the dicing lines 9 are formed by wet etching on the other surface of the wafer 1 (the surface opposite to the surface on which the energy-generating elements 3 are formed), no recess is formed at the intersection part 53 of the dicing lines 9 to leave a flat part. Accordingly, the etching surface is stabilized, and the recesses 11 can be formed on the other surface of the wafer 1 at high accuracy. Since the recesses 11 can be formed on the other surface of the wafer 1 at high accuracy, the external shape of the element substrates can be formed at high accuracy.

Figure 4B:
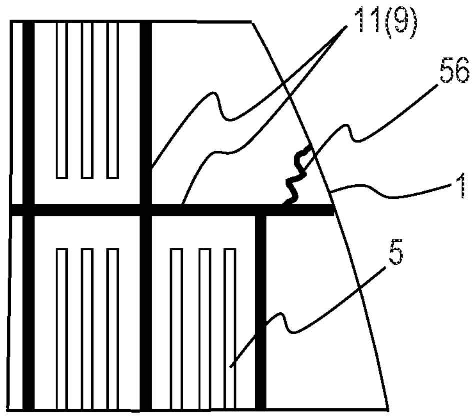

Further, if the recesses 11 corresponding to the dicing lines are formed so as to reach the circumference edge part in the back surface of a wafer, this significantly reduces the strength of the wafer. Thus, when a slight impact or vibration occurs on the wafer, a crack 56 may occur in the wafer as seen in the reference example illustrated in FIG. 4B, and the manufacturing yield of the liquid ejection head may be reduced. Accordingly, it is preferable not to form the recesses 11 to leave a flat part also in the circumference edge part 54 of the wafer 1. Thereby, the strength of the wafer 1 can be maintained, and a crack can thus be suppressed even when a slight impact or vibration occurs on the wafer 1. That is, by not forming the recess 11 to leave a flat part also in the circumference edge part 54 of the wafer 1, it is possible to suppress a crack of the wafer while forming the external shape of the element substrates at high accuracy. It is therefore possible to manufacture a liquid ejection head that can maintain a high manufacturing yield without reducing the performance of the liquid ejection head.

Note that, in the manufacturing method described above, the supply path 5 and the recesses 11 are formed in the substrate 1 by anisotropic etching after the ejection orifice forming member 7 is formed, and the wafer 1 is then diced to obtain the element substrate 10. However, the order of these steps may be changed such that the ejection orifice forming member 7 is formed after the supply path 5 and the recesses 11 are formed in the substrate 1 by anisotropic etching, and the wafer 1 is then diced to obtain the element substrate 10. In such a case, however, since the resin material forming the ejection orifice forming member 7 may enter the supply path 5, it is preferable to fill a filling material or the like in the supply path 5 in advance.

Dimensions of Recess and Dicing Blade

Figure 6A:
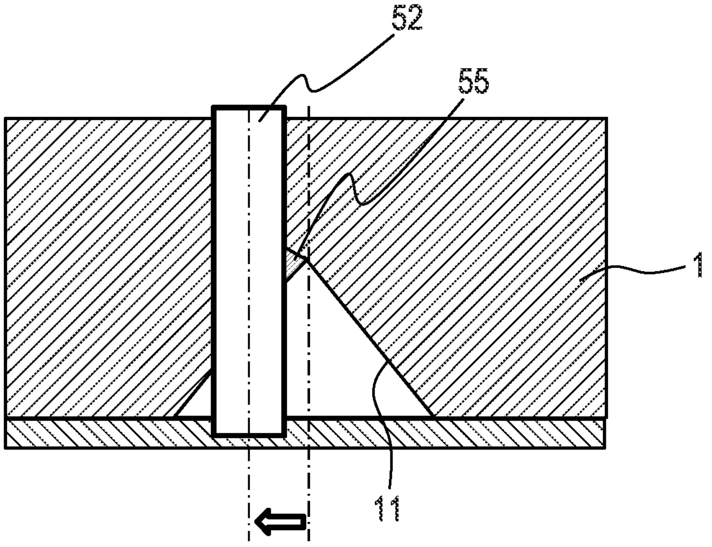
FIG. 6A and FIG. 6B are enlarged sectional views illustrating a step of dicing a wafer in the manufacturing method of the liquid ejection head illustrated in FIG. 1.
Figure 6B:
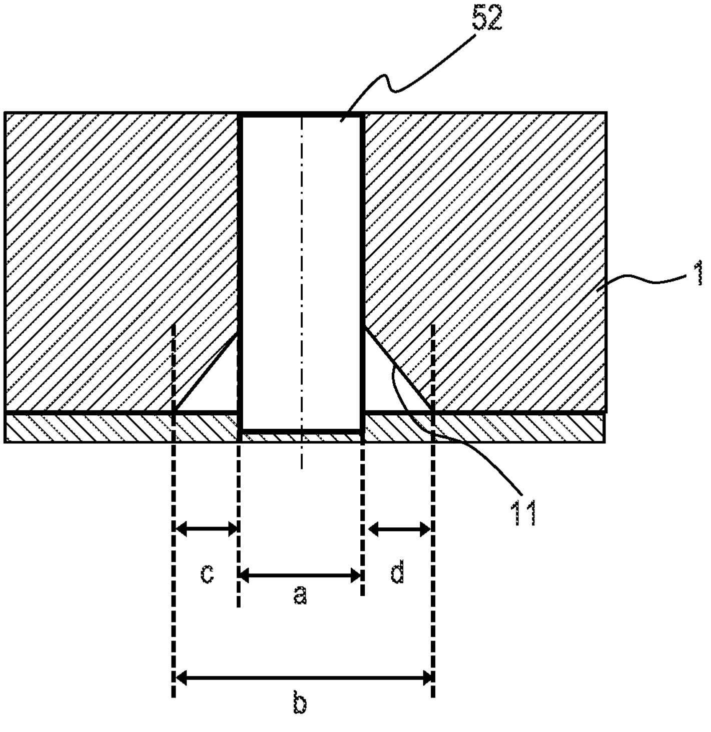

In the manufacturing method of the liquid ejection head described above, a configuration for suppressing occurrence of a defect in dicing the wafer 1 will be described. As illustrated in FIG. 6A, in a configuration in which the recess 11 provided in the other surface of the wafer 1 has a triangular cross section tapered toward the one surface (the surface on which the energy-generating element 3 is formed), there may be displacement between the apex of the recess 11 and the center of the dicing blade 52. Further, if the dicing blade 52 does not pass through the apex of the recess 11, a part near the apex of the recess 11 is not removed and remains as a burr 55. Furthermore, there is a problem of occurrence of a phenomenon called chipping in which the burr 55 is cut off, a problem of reduced accuracy in the shape and the dimension of the element substrate 10, and a problem of increased waste to be discarded. Further, in the course of manufacturing the liquid ejection head, the cut burr 55 may enter a liquid flow path including the common liquid chamber 16 and the pressure chamber 17 and clog the ejection orifices 8 or the flow path, which may cause an ejection failure. To prevent such problems, it is preferable that the dicing blade 52 pass through the apex of the recess 11. Specifically, as illustrated in FIG. 6B, the thickness of the dicing blade 52 is denoted as "a", and the width of the recess 11 (the dimension in the width direction orthogonal to the longitudinal direction) is denoted as "b". Further, the distances between the end in the width direction of the recess 11 and the end in the width direction of the dicing blade 52 on both sides of the dicing blade 52 are denoted as "c" and "d", respectively. Then, it is preferable that these dimensions a, b, c, and d satisfy the relationship of $a \geq b/3$, $c < b/2$, and $d < b/2$. Further, when the dimension "b" in the width direction of the recess 11 is greater than or equal to 100 μm and less than or equal to 200 μm, it is preferable that the thickness "a" of the dicing blade 52 be greater than or equal to 55 μm. Such a configuration allows the dicing blade 52 to easily pass through the apex of the recess 11 having a triangular cross section and dice the wafer 1. As a result, the advantageous effects described above can be obtained, and accurate wafer dicing is enabled without generating the burr 55.

Modified Examples

Figure 7A:
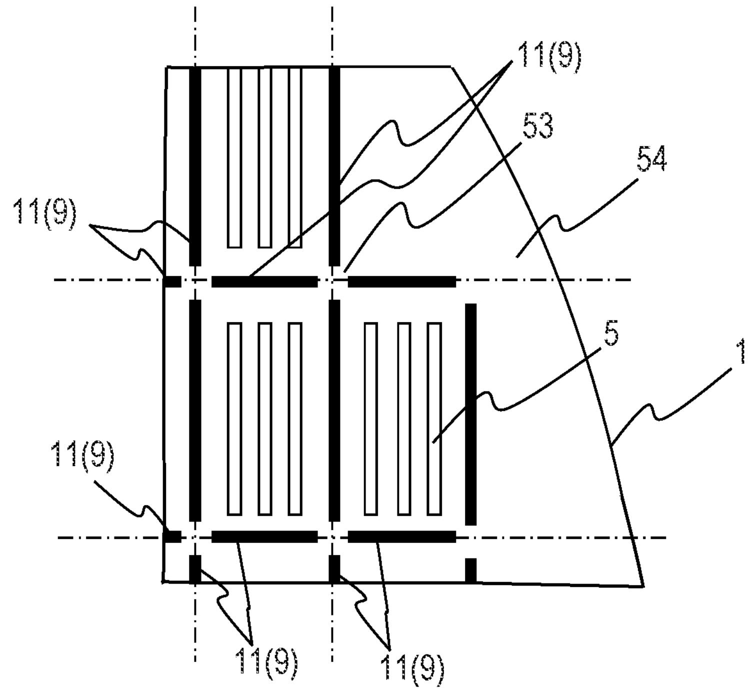
FIG. 7A, FIG. 7B, and FIG. 7C are an enlarged plan view of a main part of a wafer and plan views of a substrate in a modified example of the present disclosure.
Figure 7B:
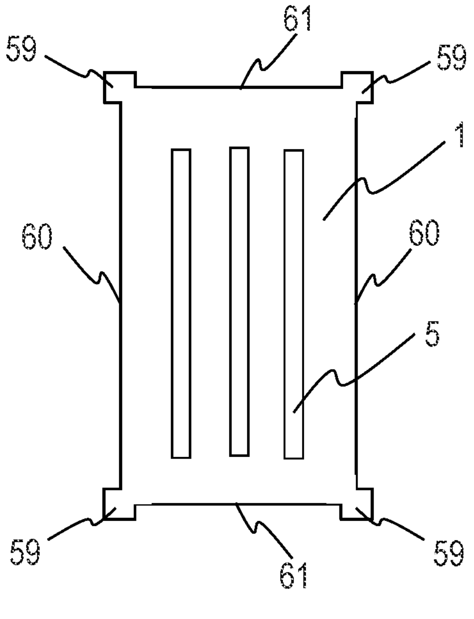
Figure 7C:
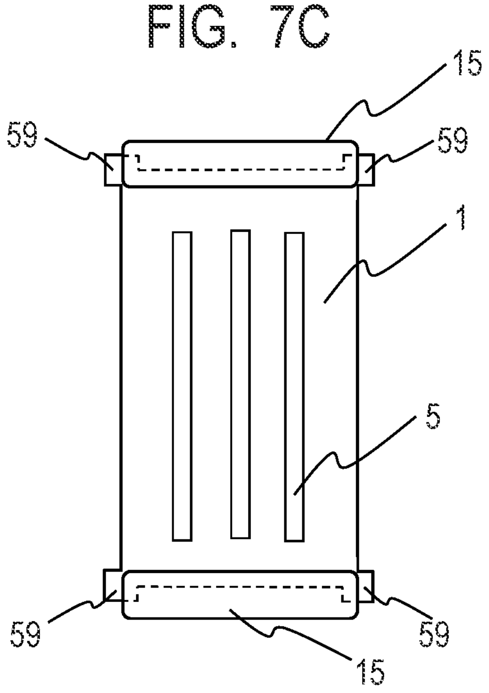

Next, a modified example of the liquid ejection head of the present disclosure will be described with reference to FIG. 7A, FIG. 7B, and FIG. 7C. Features that differentiate the present modified example from the configuration described above will be mainly described below, the same features as those of the configuration described above are labeled with the same references, and the description thereof will be omitted. Also in the present modified example, as illustrated in FIG. 7A, the intersection part 53 of the dicing lines 9 and the circumference edge part 54 of the wafer 1 are left flat without the recess 11 being formed thereon, and the recesses 11 corresponding to the dicing lines 9 are formed in the wafer 1. The wafer 1 in which the recesses 11 are formed in such a way is diced along the dicing lines 9. The planar shape of the substrate 1 of the liquid ejection head of the present modified example is substantially rectangular as illustrated in FIG. 7B, and protruding portions 59 are provided at four corners. These protruding portions 59 are portions that are located at both ends in the longitudinal direction of the substrate 1 and protrude relative to the middle part 60 of the sides extending in the longitudinal direction and also portions that are located at both ends in the shorter direction of the substrate 1 and protrude relative to the middle part 61 of the sides extending in the shorter direction. According to the element substrate 10 having such protruding portions 59, the advantageous effects described above can be obtained, and when sealing materials 15 for protecting electric junction parts are provided as illustrated in FIG. 7C, fluid deformation of the sealing materials 15 can be suppressed. As a result, a more stable sealing state can be maintained. Note that it is preferable that the protruding portions 59 and the substrate 1 be integrally formed of the same member, and the same advantageous effects as described above can be obtained.

As described above, according to the present disclosure, when the recesses 11 corresponding to the dicing lines 9 are formed by applying wet etching to the other surface of the wafer 1 (the surface opposite to the surface on which the energy-generating elements 3 are formed), the etching surface is stabilized, and the recesses 11 can be formed at high accuracy. Further, since the strength of the wafer 1 can be maintained because the circumference edge part 54 of the wafer 1 is left without the recess 11 being formed thereto, a crack in the wafer 1 can be suppressed even when a slight impact or vibration occurs on the wafer 1.

According to the present disclosure, it is possible to provide a liquid ejection head that achieves an accurate external shape of element substrates, high liquid ejection performance, and a high manufacturing yield and provide a manufacturing method thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-130914, filed Jul. 31, 2020, which is hereby incorporated by reference herein in its entirety.

What is claimed is:

1. A manufacturing method of a liquid ejection head, the manufacturing method comprising steps of:

providing an ejection orifice forming member on one surface of a wafer, an energy-generating element being provided on the one surface of the wafer;

forming a recess on the other surface of the wafer; and dicing the wafer along a plurality of dicing lines, wherein the plurality of dicing lines include a dicing line extending in one direction and a dicing line extending in a direction crossing the one direction, and wherein the recess is formed on the dicing line extending in the one direction and the dicing line extending in the direction crossing the one direction, and the recess is not formed on an intersection part where the dicing line extending in the one direction intersects the dicing line extending in the direction crossing the one direction.

2. The manufacturing method of the liquid ejection head according to claim 1, wherein the recess is formed at each of positions overlapping the dicing lines further except for a circumference edge part of the wafer.

3. The manufacturing method of the liquid ejection head according to claim 1, wherein the recess is formed by wet etching of the wafer.

4. The manufacturing method of the liquid ejection head according to claim 1, wherein a plurality of element substrates are formed by dicing, along the dicing lines, the wafer on which the ejection orifice forming member is provided, and wherein the dicing lines are provided at positions each corresponding to a contour of each of the element substrates.

5. The manufacturing method of the liquid ejection head according to claim 1, wherein each of the dicing lines is a groove-shaped cut-out part provided in a resin material forming the ejection orifice forming member.

6. The manufacturing method of the liquid ejection head according to claim 1, wherein dicing of the wafer is performed by using a dicing blade, and wherein a≥b/3, c<b/2, and d<b/2, where "a" denotes a thickness of the dicing blade, "b" denotes a dimension in the width direction orthogonal to the longitudinal direction of the recess, and "c" and "d" denote distances between an end in the width direction of the recess and an end in the width direction of the dicing blade on both sides of the dicing blade, respectively.

7. The manufacturing method of the liquid ejection head according to claim 1, wherein dicing of the wafer is performed by using a dicing blade, and wherein a dimension "b" in the width direction orthogonal to the longitudinal direction of the recess is greater than or equal to 100 μm and less than or equal to 200 μm, and a thickness "a" of the dicing blade is greater than or equal to 55 μm.

8. The manufacturing method of the liquid ejection head according to claim 6, wherein the recess has a triangular cross section tapered from the other surface to the one surface of the wafer, and wherein the dicing blade passes through an apex of the recess having the triangular cross section and dices the wafer.

9. The manufacturing method of the liquid ejection head according to claim 1, wherein a substrate obtained by division of the wafer has a supply path used for supplying a liquid to the ejection orifice forming member, and the supply path and the recess are formed at the same time.

10. The manufacturing method of the liquid ejection head according to claim 9, wherein a plurality of pressure chambers and a common liquid chamber communicating with the plurality of pressure chambers are formed between the ejection orifice forming member and the substrate, and the supply path of the substrate communicates with the common liquid chamber.

11. The manufacturing method of the liquid ejection head according to claim 1, wherein the substrate has a rectangular planar shape, and protruding portions are provided at four corners of the substrate.

12. The manufacturing method of the liquid ejection head according to claim 11, wherein the protruding portions are portions that are located at both ends in the longitudinal direction of the substrate and protrude relative to a middle part of sides extending in the longitudinal direction and that are located at both ends in the shorter direction of the substrate and protrude relative to a middle part of sides extending in the shorter direction.

* * * * *